US005864654A

United States Patent [19]
Marchant

[11] Patent Number: 5,864,654
[45] Date of Patent: Jan. 26, 1999

[54] SYSTEMS AND METHODS FOR FAULT TOLERANT INFORMATION PROCESSING

[75] Inventor: Brian E. Marchant, Woodside, Calif.

[73] Assignee: NEC Electronics, Inc., Santa Clara, Calif.

[21] Appl. No.: 801,237

[22] Filed: Feb. 19, 1997

Related U.S. Application Data

[63] Continuation of Ser. No. 415,010, Mar. 31, 1995, abandoned.

[51] Int. Cl.$^6$ ................................................. G06F 13/00
[52] U.S. Cl. ................................... 395/182.01; 371/36
[58] Field of Search ....................... 395/182.01, 182.02, 395/185.06, 874, 877, 876, 881, 182.04, 182.03; 371/36, 67.1, 68.2

[56] References Cited

U.S. PATENT DOCUMENTS

| | | | |
|---|---|---|---|
| 4,228,496 | 10/1980 | Katzman et al. | 364/200 |
| 4,392,199 | 7/1983 | Schmitter et al. | 364/200 |
| 4,453,215 | 6/1984 | Reid | 364/200 |
| 4,562,575 | 12/1985 | Townsend | 371/9 |
| 4,644,538 | 2/1987 | Cooper et al. | 371/9 |
| 4,773,072 | 9/1988 | Fennel | 371/68 |
| 4,774,709 | 9/1988 | Tulphe et al. | 371/11 |
| 4,819,156 | 4/1989 | DeLorme et al. | 364/200 |
| 4,823,256 | 4/1989 | Bishop et al. | 364/200 |
| 4,849,979 | 7/1989 | Maccianti et al. | 371/68 |
| 4,881,166 | 11/1989 | Thompson et al. | 364/200 |
| 5,008,805 | 4/1991 | Fiebig et al. | 364/184 |
| 5,072,368 | 12/1991 | Foreman et al. | 395/575 |
| 5,086,499 | 2/1992 | Mutone | 364/200 |
| 5,088,021 | 2/1992 | McLaughlin et al. | 364/187 |
| 5,140,689 | 8/1992 | Kobayashi | 395/575 |
| 5,146,589 | 9/1992 | Pete, Jr. et al. | 395/575 |
| 5,247,664 | 9/1993 | Thompson et al. | 395/600 |
| 5,271,023 | 12/1993 | Norman | 371/68.3 |
| 5,278,843 | 1/1994 | Ako | 371/36 |
| 5,329,521 | 7/1994 | Walsh et al. | 370/16 |
| 5,343,477 | 8/1994 | Yamada | 371/8.2 |
| 5,448,724 | 9/1995 | Hayashi | 395/182.02 |
| 5,485,604 | 1/1996 | Miyoshi et al. | 395/182.08 |
| 5,515,282 | 5/1996 | Jackson | 364/434 |
| 5,606,693 | 2/1997 | Nilsen et al. | 395/610 |
| 5,630,046 | 5/1997 | Loise | 395/182.09 |
| 5,630,053 | 5/1997 | Morikawa | 395/184.01 |
| 5,668,986 | 9/1997 | Nilsen et al. | 395/610 |

OTHER PUBLICATIONS

Thomas, R.H., "A majority Consensus Approach to Concurrency Control for Multiple Copy Databases," ACM Transaction on Database Sys; vol. 4, No. 2, pp. 180–209, Jun. 1979.

Bernstein, P.A., "Concurrency Control in Distributed Database Sys.," Computing Surveys, vol. 13, No. 2, pp. 185–221, Jun. 1981.

Elmarsi, R. Fundamental, of database Sys., Benjamin/Cummings Pub. Co., Redwood City, CA., Chapt. 21, 1989.

Helal, A. et al. "Seith: A Quorum–Based Database Sys. for experimentation w/failures, " Data Engineering 5th Intl. Conf; pp. 677–684, 1989.

(List continued on next page.)

*Primary Examiner*—Albert Delady
*Assistant Examiner*—Norman M. Wright
*Attorney, Agent, or Firm*—Skjerven, Morrill, MacPherson, Franklin & Friel, L.L.P.; Stephen A. Terrile

[57] ABSTRACT

A fault-tolerant management information system includes three or more data management systems (e.g. data base systems) that replicate data. Data access requests resulting from user requests to application systems are issued by user request processing entities and forwarded by interceptors to all the data management systems. Responses from the data management systems are obtained, and a maximum group of identical responses provides the correct response, even in the case of "soft" errors not flagged by error codes. Errors are reported to an administration system, and correction of the data base containing the errors is handled by a recovery server. Overall system performance is further enhanced by including data base query systems, which replicate the data. Data access requests resulting from data base query requests are issued by query systems to the data base query systems.

14 Claims, 2 Drawing Sheets

OTHER PUBLICATIONS

Fuhrman et al., A fault–tolerant Implementation using multiple task tmr, IEEE, pp. 75–80, May 1995.

Pittelli et al., Reliable Scheduling in a TMR database sys., ACM vol. 7, No. 1, pp. 25–38, 1989.

Fuhrman et al., A Fault–Tolerant Implementation Using Multiple Task TMR, IEEE, pp. 75–80, May 1995 (copy not enclosed).

Pittelli et al., Reliable Scheduling in a TMR Database Sys., ACM vol. 7, No. 1, pp. 25–38 (copy not enclosed).

"WorkStream DFS/A™", Consilium, Inc. Brochure, Feb. 1993, 6 pages (copy not enclosed).

"Semiconductor Automation and the Role of WorkStream DFS/A", Consilium publication, Sep. 1993, pp. 1–12 (copy not enclosed).

"Quick Start Semiconductor Automation Program Description", ITP Systems (date unknown), 2 pages (copy not enclosed).

"Replication Server: A Component of SYBASE System 10," SYBASE® Publication, Apr. 1993, pp. 1–25 (copy not enclosed).

"SYBASE Replication Server", SYBASE® publication, May 1993, pp. 1–8 (copy not enclosed).

"WorkStream DFS\A™", Consilium, Inc. Brochure, Feb. 1993, 6 pages.

"Semiconductor Automation and the Role of WorkStream DFS\A", Consilium publication, Sep., 1993, pp. 1–12.

"Quick Start Semiconductor Automation Program Description", ITP Systems (date unknown), 2 pages.

"Replication Server: A Component of SYBASE System 10," SYBASE® Publication, Apr. 1993, pp. 1–25.

"SYBASE Replication Server," SYBASE® Publication, May, 1993, pp. 1–8.

SYSTEMS AND METHODS FOR FAULT TOLERANT INFORMATION PROCESSING

This application is a continuation of application Ser. No. 08/415,010, filed Mar. 31 1995, now abandoned.

CROSS-REFERENCE TO RELATED APPLICATION

Some of the subject matter of this application is related to subject matter described in U.S. patent application Ser. No. 08/236,609 entitled "Semiconductor Processing Backup System" filed May 2, 1994 by A. Hager, B. Marchant, S. Chuang, and K. Kim, which is hereby incorporated herein in its entirety by reference thereto.

BACKGROUND OF THE INVENTION

The present invention relates to computer-based fault tolerant information systems.

Information systems are finding increased use in applications for which uninterrupted access to reliable data bases is important. For example, one type of computer-based information system common in large companies is the management information system, or MIS. A management information system is a computerized system used by the company's management and personnel to handle purchase and shipping orders and to perform tasks related to accounts payable and receivable, payroll, personnel management, word processing, and other business, managerial and clerical work.

An important goal for management information systems, as well as other information systems, is fault tolerance. When for example an MIS goes down due to a fault, purchase orders from customers cannot be taken and other tasks are suspended, resulting in large financial losses.

Thus, it is desirable to provide an information system that is not brought down by a fault but that stays on line and, moreover, continues to provide correct information. This is particularly important for multinational corporations with offices scattered across different time zones. While some offices are closed, offices in other time zones are open, and the MIS may have to be on line 24 hours a day, 7 days a week to support worldwide operation of such a corporation.

SUMMARY

A problem with fault identification and recovery in many management information systems is detection of "soft" errors as opposed to "hard" errors. A hard error is an error that is flagged as an error in a response to a data access request, or an error that does not permit a response to occur. Examples of such errors are disk crashes and parity errors. A soft error, on the other hand, is not identified as an error in a response to a data access request, and so is not easily detectable. Soft errors may be caused by data corruption or by malfunction of disks, disk controllers, or other computer and communication equipment handling the data access request.

If data are replicated on different data storage systems to improve fault tolerance, and a data access request is issued to different data storage systems and a soft error occurs in a response from at least one system, the occurrence of the soft error can be determined by comparing the responses from the different systems because in case of error the responses will typically be different. However, the question arises which of the different responses is correct. It is important to identify the correct response so that the user perceives the MIS to be operating in a nonstop fault free condition. Further, it is important to identify the data storage system that provided the incorrect response, so as to be able to permit prompt repair of the malfunctioning data storage system.

The present invention provides in one embodiment a fault-tolerant information system that includes three or more data management systems such as, for example, three or more data base systems. The data is replicated in the data base systems. Each data access request is forwarded to the data management systems. The data management systems respond to the data access requests, and the resulting responses from the data management systems are compared. If all the responses are identical, no fault is presumed to have occurred, and all data bases are presumed to contain correct data. If the responses are different, an error in at least one of the data management systems is indicated. A maximum group of identical responses is identified. The data management systems providing responses to the maximum group are presumed to be correct while the other data management system or systems are presumed to have malfunctioned or to contain an error.

Since the information system includes at least three data management systems, and since it is unlikely that more than one data management system will fault on the same data access request, the maximum group is identified as a group of at least two responses, and the data management systems identified as furnishing the correct responses typically will indeed be error-free. Hence a nonstop fault tolerant operation is provided.

In a further embodiment, the response(s) different from the best response are identified, as well as their data management systems, and are reported to the system administrator. Corrective action is promptly taken.

In some embodiments, the maximum group does not include responses which identify hard errors. Hard errors are identified by error codes in the responses, or by non-receipt of a response within a predetermined period of time. The data management systems that generate hard errors also report the hard errors to the system administrator.

In yet other embodiments, a recovery server is provided that updates the faulty data management system or systems when they return to normal operation.

Other features and advantages of the invention are described below. The invention is defined by the appended claims.

DESCRIPTION OF THE PREFERRED EMBODIMENTS

Figure 1:
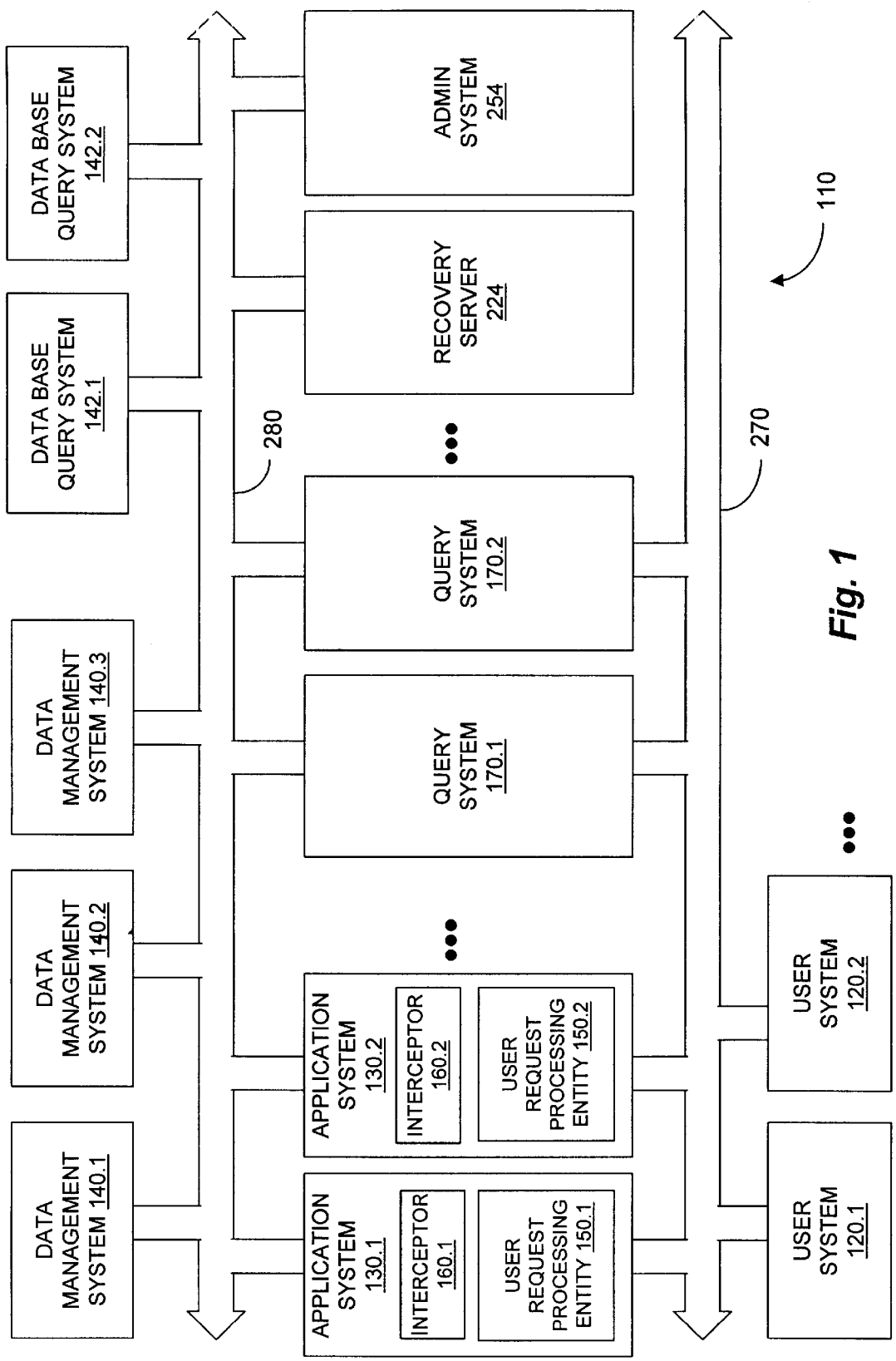
FIG. 1 is a block diagram of a management information system according to the present invention.

FIG. 1 is a block diagram of a fault-tolerant information system, illustratively a management information system 110. System 110 includes user computer systems 120.1, 120.2, and perhaps other such systems; application computer systems 130.1, 130.2, and perhaps other such systems; and at least three data management systems 140.1, 140.2, 140.3, and perhaps other such systems. Suitable computers for use as user systems 120 include, illustratively, personal computers and workstations. Suitable computers for use as application systems 130 include, illustratively, personal computers, workstations, and file servers. Suitable computers for use as data management systems 140 and data base query systems 150 include, illustratively, workstations, file servers and mainframes. User systems 120, applications systems 130, and data management systems 140 are interconnected by a local network 280, illustratively a LAN, and a remote network 270, illustratively either a LAN or WAN. Alternatively, a single network may be used to interconnect user systems 120, applications systems 130, and data management systems 140.

User systems 120 issue user requests such as, for example, purchase orders, requests to ship goods or provide services, requests to record received payments such as generated by accounts receivable departments, requests to record payments such as generated by accounts payable departments, requests to record or supply information on a particular person or company such as generated by human resources departments or business or sales personnel, requests to fetch or store data for word processing, or other requests handled by management information systems. In addition to issuing user requests, the user systems 120 typically run graphical user interface software and provide a small degree of localized processing.

A user request is forwarded to one or more of the application systems 130 capable of processing the request. While in some embodiments each of the application systems are capable of processing all types of requests, in the embodiment of FIG. 1, illustratively, different ones of the application systems 130 process different kinds of requests. For example, in some embodiments, application system 130.1 processes purchase orders for circuit boards, and application system 130.2 processes purchase orders for computer terminals. In some embodiments, two or more of the application systems 130 are each capable of processing the same types of user requests.

Each application system 130.$i$ includes a corresponding user request processing entity 150.$i$ which processes particular types of user requests. Illustratively, each entity 150.$i$ includes in some embodiments a computer program and appropriate resources (not shown) of application system 130.$i$ that are needed to execute the program. Such resources include in some embodiments a central processing unit (CPU), memory space, disk storage, and/or other resources of application system 130.$i$. Alternatively, some functions of the computer program can be implemented in dedicated hardware or firmware, if desired.

Typically, user requests require access to the data management systems 140 for acquiring data to be processed from the data management systems 140 and for updating the data management systems 140 in accordance with the results of the processing. For example, the processing of a purchase order requires read access to data base files on the buyer's account, the buyer's credit worthiness, inventory, and perhaps other information, followed by write access to the data base files to update the buyer's account and inventory, as well as other information about the sales transaction. Some or all of such information is stored on the data management systems 140.

Each data management system 140.$i$ includes in some embodiments a computer system that functions as a data base server. In the absence of data errors and equipment failure, each system 140.$i$ replicates the same data and processes the same data access requests.

To access the systems 140, user request processing entity 150.$i$ issues a data access request to the corresponding interceptor entity 160.$i$ of application system 130.$i$. In some embodiments, each interceptor 160.$i$ includes (1) a computer program, and (2) application system 130.$i$ computer resources that are needed to execute the program. Such resources include in some embodiments a central processing unit (CPU), memory space, disk storage, and/or other resources of application system 130.$i$. Alternatively, some functions of the computer program can be implemented in dedicated hardware or firmware, if desired.

Figure 2:
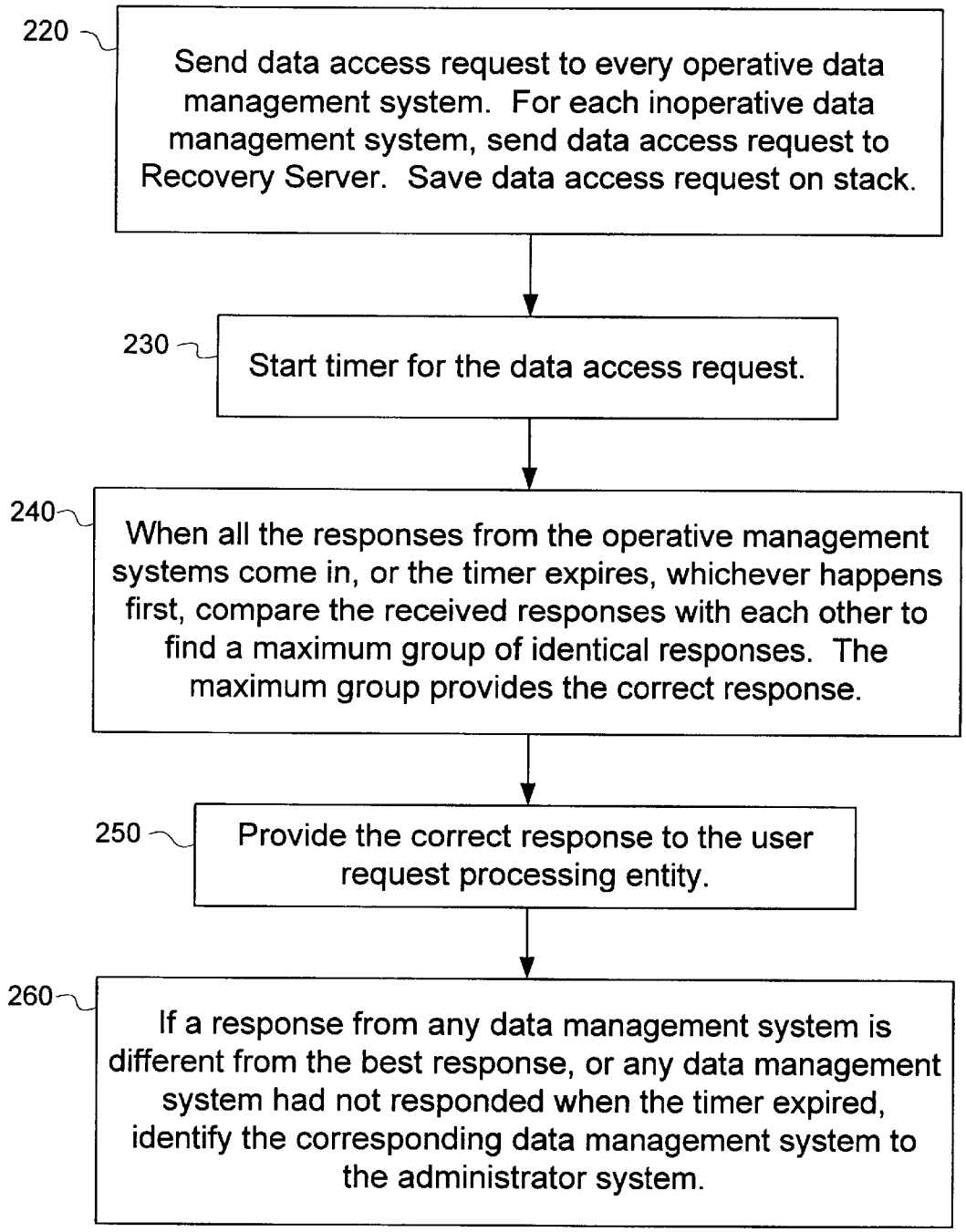
FIG. 2 is a pseudocode illustration of the operation of an interceptor of FIG. 1.

The operation of interceptor 160.$i$ is illustrated in pseudocode in FIG. 2. At step 220, interceptor 160.$i$ sends a data access request to each of the operative ones of the data management systems 140, typically in response to a user request being handled by application system 130.$i$. Interceptor 160.$i$ keeps track in its computer memory of all the data management systems 140 that are operative. For each inoperative data management system, the interceptor sends the data access request to recovery server 224 (FIG. 1).

Recovery server 224 is in some embodiments a computer system attached to the same network as the systems 120, 130, 140, illustratively network 280 in FIG. 1. Recovery server 224 queues the data access request. In the typical failure mode, the inoperative data management system is made operative without reconstructing its data base, and recovery server 224 issues the queued requests to the previously inoperative data management system to update the data stored therein. However, if the inoperative data management system failed catastrophically, the data base may need to be entirely reconstructed directly by the system administrator using one of the operational data management systems before the inoperative data management system can be brought on-line.

At step 220, interceptor 160.$i$ also saves the data access request on its stack.

At step 230, interceptor 160.$i$ starts a timer allocated for the data access request. A separate timer is allocated by the interceptor for each data access request issued by the interceptor.

While interceptor 160.$i$ waits for responses from the data management systems 140, interceptor 160.$i$ is available for processing other data access requests from the user request processing entity 150.$i$.

Step 240 is executed when the interceptor 160.$i$ has received all the responses from operative data management systems to the request issued at step 220, or when the timer has expired, whichever comes first. In one embodiment, the interceptors 160 are able to detect hard and soft errors. The interceptors 160 detect hard errors from error codes in the response or from non-receipt of a response. To detect soft errors, interceptors 160 determine the maximum group of identical responses from the responses that show no hard errors. For example, in step 240, if data management systems 140.1, 140.2, 140.3 are the only operative data management systems which returned a response without a hard error, and the responses from systems 140.1, 140.2 are identical to each other but the response from system 140.3 is different, the maximum group consists of the responses from systems 140.1, 140.2. Interceptor 160.$i$ assumes that the responses in the maximum group are correct while the other response is in error.

In other embodiments, interceptors 160 determine the maximum group from all the received responses without checking for hard errors.

In some cases, the maximum group cannot be uniquely determined. This may happen if there are only two operative data management systems 140 providing different responses, or if there are five operative data management systems 140 providing two responses that are identical to each other but different from two other identical responses, and a fifth response different from the other four. In such cases, interceptors 160 in some embodiments select a correct response as a maximum group response with the lowest network address.

At step 250, interceptor 160.i provides the correct response to the corresponding user request processing entity 150.i.

In one embodiment, the method of FIG. 2 is applicable to only a particular type of data access requests, namely a read-after-write data access request. In these embodiments, the interceptors 160 are active only for reads of data recently written to update the data bases maintained by the data base management systems 140, and are not active for normal reads from the data bases. This embodiment provides good fault tolerance without unduly burdening the overall system and slowing its response. For other embodiments requiring optimal fault tolerance, the method of FIG. 2 may be made applicable to all reads. In these embodiments, the interceptors 160 are active for both normal reads as well as reads of data recently written to update the data bases.

The operation of the management information system 110 may be better appreciated by considering in more detail how a sales transaction is processed in an illustrative embodiment in which the interceptors 160 are active for read-after-write accesses. An account manager closing a sales transaction with a customer might enter a purchase order into the management information system 110 using user system 120.1, for example. The user system 120.1 then places a sales transaction request on the network 270 in response to entry of the purchase order, and the sales transaction request is acknowledged and handled by a particular one of the applications systems 130 programmed to handle such requests; for example, application system 130.2. The user sales transaction request is processed by user request processing entity 150.2, which reads data from the data management systems 140 to process the sales transaction request and updates the data management systems 140 based on the results of processing the sales transaction request, which in this example is a purchase order acknowledgment setting forth the payment schedule and delivery date for the purchased goods. In some sales transactions, the user request processing entity 150.2 might determine several alternative purchase order acknowledgments. In this event, the user request processing entity 150.2 identifies the optimal result and updates the data management system 140 in accordance therewith.

Once the data management systems 140 are updated, the user request processing entity 150.2 issues a read-after-write access request to interceptor 160.2, which in turn causes the application system 130.2 to send the read-after-write data access request to the data management systems 140. The correct response is determined by the interceptor 160.2 in accordance with step 240 and is reported to the user request processing entity 150.2 in accordance with step 250. If errors are discovered, a recovery procedure is initiated.

The purchase order acknowledgment is reported back to the account manager at user system 120.1. If several responses were determined, the user request processing entity 150.2 causes the application system 130.2 to report all alternatives to the account manager. The account manager most likely will select the optimal result as determined by the user request processing entity 150.2. However, if he or she selects a result not anticipated by the user request processing entity 150.2, the application system will back out the previous result from the data management systems 140 and substitute the result selected by the account manager.

Management information system 110 includes one or more administrator systems 254 (FIG. 1) each of which includes a computer system running network administration software. At step 260 (FIG. 2), interceptor 160.i reports to the administrator system(s) 254 all of the data management systems 140, if any, for which a hard or soft error was detected. Administrator system(s) 254 take corrective action which includes, depending on the embodiment, printing a faults report, scheduling testing and maintenance work on the faulty data management systems, and/or some other actions. Meanwhile, interceptor 160.i routes subsequent data access requests for the faulty data management systems to recovery server 224. In some embodiments, administrator(s) 254 informs one or more of the other application systems 130.j of the faulty data management systems. Consequently, one or more, and perhaps all, of the other interceptors 160.j mark the faulty systems as inoperative and route data access requests for the faulty data management systems to recovery server 224.

When a faulty data management system has recovered, the application systems 130 are informed thereof by administrator 254 and begin to route data access requests to the recovered system, treating the system as operative. In some embodiments, more than one recovery server is provided. In some embodiments, different recovery servers handle the recovery of different data managements systems and thus receive data access requests for different faulty data management systems. In some embodiments, one recovery server receives data access requests that must be executed in the sequence in which they were issued, and another recovery server receives data access requests whose execution sequence is not essential.

Interceptors 160 provide a high degree of fault tolerance when at least three data management systems 140 are operative. More specifically, it is unlikely that more than one of the data management systems 140 will generate a soft error in response to any given data access request. Consequently, in most cases the maximum group of identical responses provides the correct response, allowing nonstop fault-free MIS operation. Further, database management systems generating either soft or hard errors will be identified, and reported, immediately at step 260. A prompt corrective action can be taken, improving the fault tolerance.

The management information system 110 is easily expandable. In some embodiments, the application systems 130 are personal computers which can be easily and cheaply added, replaced, upgraded, or moved around. Application systems 130 are allocated to different user request types to provide an adequate load balancing. User systems 120, application systems 130, and/or data management systems 140 can be scattered all around the world to provide a management information system for a worldwide conglomerate. Each of the data bases may be consolidated or distributed. Due to its high fault tolerance as described above, MIS 110 can provide a reliable, nonstop operation 24 hours a day, 7 days a week.

In some embodiments, MIS 110 includes additional user and/or application systems which perform backups, testing of new hardware or software components, and system diagnostics and recovery. For example, where one of the data management systems 140 is implemented on equipment that has been modified or runs modified software, error free operation indicates a successful modification while the occurrence of errors indicates an unsuccessful modification.

The modified system should be taken off-line and corrective action taken. However, neither failure of the modified system nor removal of the failed system impacts the management information system 110, which remains operational and fully fault tolerant during these operations.

The overall performance of the management information system 110 may be improved by including one or more data base query systems 142 to enhance load balancing. Illustratively, the data base is reproduced on each of the data base query systems 142, and user requests for read access to the data base requiring no application processing are handled by the query systems 170 by accessing the data base query systems 142. Illustratively, the data base query systems 142 are updated after the results of a user request are confirmed by the user; alternatively, updating is performed in the same manner as for data management systems 140. Illustratively, the query systems 170 need not be provided with interceptors. Alternatively, interceptors may be included in the query systems 170, and made active during read accesses to ensure optimal fault tolerance.

Management information system 110 provides a wide variety of services. Purchase orders are entered from the user systems 120, and automatically processed by the application systems 130. User request processing entities 150 verify the purchase orders, update information stored in data management systems 140 as needed, and issue data access requests to verify the data. Purchase orders that require manual processing are forwarded by the application systems to certain of the user systems 120 located in offices in which manual processing is performed. Shipment orders are forwarded to certain of the user systems 120 located at stores or warehouses containing the goods. Application systems 130 provide to user systems 120 personnel information, word processing services, accounts payable and receivable services, inventory services, word processing services, e-mail, and other services as needed.

While the invention has been illustrated with respect to the embodiments described above, other embodiments and variations are within the scope of the invention. In particular, the invention is not limited by any specific implementation of the user systems 120, application systems 130, or data management systems 140. In some embodiments, one or more of the data management systems 140 is a distributed database management system with data spread over several computers. In some embodiments, the same computer stores and manages data from different data management systems 140. Moreover, the invention is not limited to any particular network configuration. In FIG. 1, the network 270 provides data flow between user systems 120 and application systems 130, while network 280 provides data flow between application systems 130, data management systems 140, and recovery server 224. However, a single network may be used in place of separate networks 270 and 280, which are set forth for convenience of illustration and do not limit the invention to any particular network arrangement. Networks may include local area networks, wide area networks, or a combination thereof. Moreover, the segregation of functionality between the integrator and the user request processing entity of an application system is illustrative, and some of the functionality may be differently located without departing from the scope of the invention. Other embodiments and variations are within the scope of the invention as defined by the following claims.

What is claimed is:

1. A method for providing fault tolerant information management, comprising:

generating a user request;

communicating the user request to an application processing system;

processing the user request in the application processing system, whereby data access requests are generated;

furnishing the data access requests to each of at least three data management systems having redundant data bases;

receiving a plurality of responses to the data access requests from the data management systems;

determining an optimal response from the plurality of responses;

providing the optimal response to the data storage systems responsive to receiving the plurality of responses from the data storage systems;

providing the plurality of responses and the optimal response to a user system; and;

issuing a corresponding user request responsive to receiving a plurality of responses from the data storage systems.

2. A method as in claim 1 wherein the data access request is a read-after-write access of the data management systems.

3. A method as in claim 1 wherein the data access request is a read access of the data management system.

4. A method as in claim 1 further comprising updating an incorrectly responding data management system with the correct response.

5. The method of claim 1 further comprising identifying a maximum group of non-conflicting responses from the data storage systems; and providing to the user system a response derived from the maximum group of non-conflicting responses.

6. The method of claim 1 further comprising providing a selected response for communication to the data storage systems responsive to the user selecting one of the plurality of responses that is not the optimal response.

7. A computer-based information management system comprising:

a network;

a plurality of user systems coupled to the network;

at least three redundant data storage systems coupled to the network; and a plurality of application systems coupled to the network, each of the application systems including:

a user request processing entity coupled to the network to receive user requests from the user systems; and an interceptor coupled to the user request processing entity to receive one or more data access requests from the user request processing entity, the interceptor coupled to the network to communicate each data access request to the data storage systems and to receive a response from each of the data storage systems for each data access request, the interceptor comparing the responses from the data storage systems to check for soft errors responsive to receiving the responses from the data storage systems;

wherein, responsive to receiving a plurality of responses from the data storage systems via the interceptor, the user request processing entity determines an optimal response from the plurality of responses and provides the optimal response to the data storage systems; and, wherein, responsive to receiving a plurality of responses from the data storage systems, the user request processing entity provides the plurality of responses and the optimal response to a user system issuing a corresponding user request.

8. The computer-based information management system of claim 7, wherein the interceptor is coupled to the network to determine which data storage systems are operative; and communicate each data access request to the data storage systems that are determined by the interceptor to be operative.

9. The computer-based information management system of claim 7, wherein, responsive to receiving a plurality of responses from the data storage systems, the interceptor identifies a maximum group of non-conflicting responses from the data storage systems; and provides to the user request processing entity a response derived from the maximum group of non-conflicting responses.

10. The computer-based information management system of claim 7, wherein, responsive to the user selecting one of the plurality of responses that is not the optimal response, the user request processing entity provides the selected response to the interceptor for communication to the data storage systems.

11. An application system for use in a computer-based information management system, the computer-based information management system including a network, a plurality of user systems coupled to the network at least three redundant data storage systems coupled to the network and a plurality of the application systems, each application system comprising:

a user request processing entity coupled to the network to receive user requests from the user systems; and an interceptor coupled to the user request processing entity to receive one or more data access requests from the user request processing entity, the interceptor coupled to the network to communicate each data access request to the data storage systems and to receive a response from each of the data storage systems for each data access request, the interceptor comparing the responses from the data storage systems to check for soft errors responsive to receiving the responses from the data storage systems;

the user request processing entity determining an optimal response from the plurality of responses and providing the optimal response to the data storage systems responsive to receiving a plurality of responses from the data storage systems via the interceptor; and, the user request processing entity providing the plurality of responses and the optimal response to a user system issuing a corresponding user request responsive to receiving a plurality of responses from the data storage systems.

12. The application system of claim 11, wherein the interceptor is coupled to the network to determine which data storage systems are operative; and communicate each data access request to the data storage systems that are determined by the interceptor to be operative.

13. The application system of claim 11 wherein, responsive to receiving a plurality of responses from the data storage systems, the interceptor identifies a maximum group of non-conflicting responses from the data storage systems; and provides to the user request processing entity a response derived from the maximum group of non-conflicting responses.

14. The application system of claim 11 wherein, responsive to the user selecting one of the plurality of responses that is not the optimal response, the user request processing entity provides the selected response to the interceptor for communication to the data storage systems.

* * * * *